Jan. 13, 1970  S. M. LOVELESS  3,489,155
PNEUMATIC PROGRAMMER
Filed March 8, 1967  3 Sheets-Sheet 1
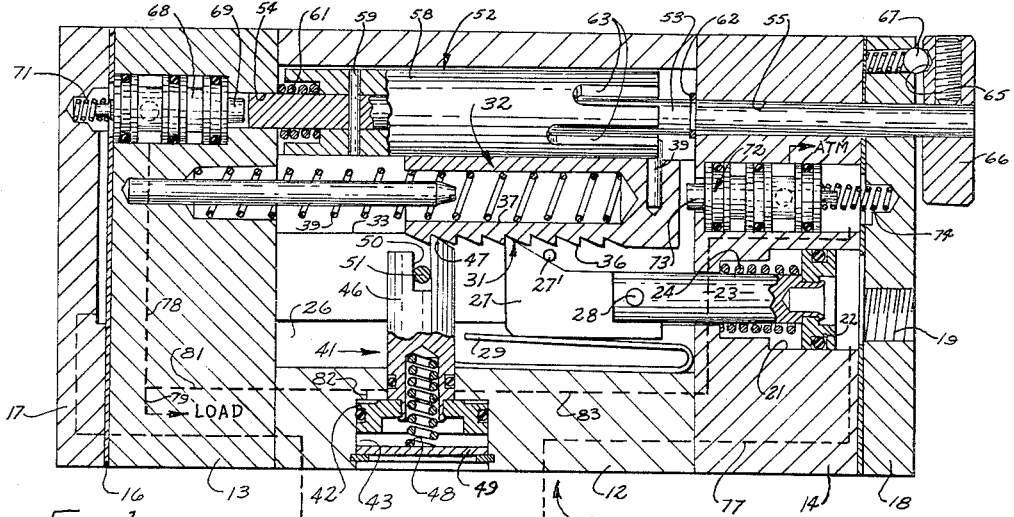
Fig. 1
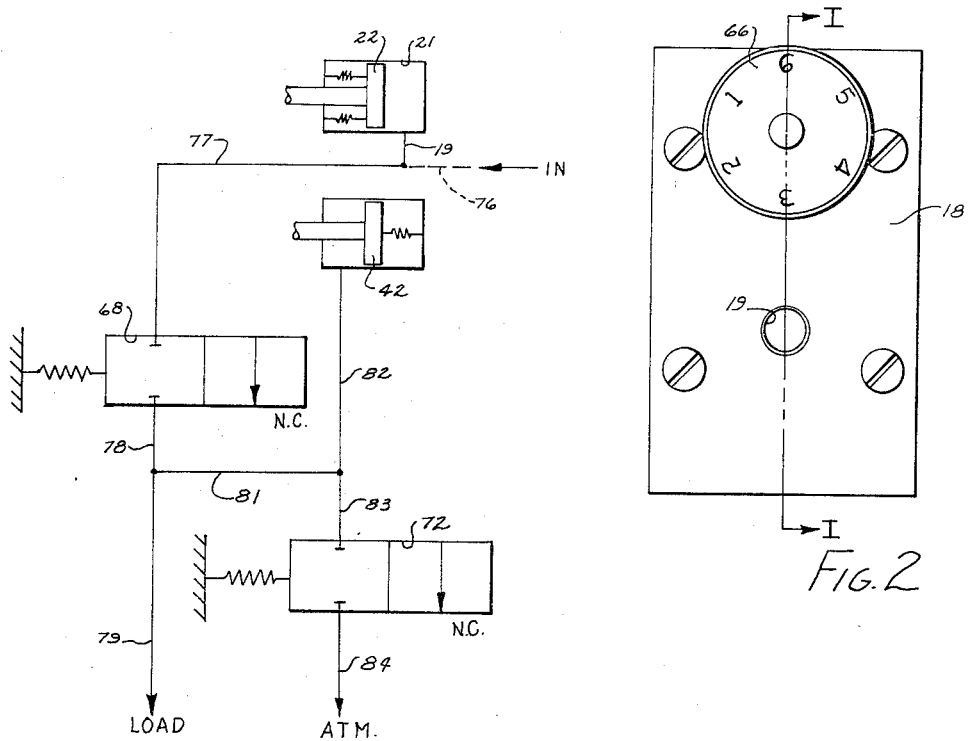
Fig. 3
Fig. 2
INVENTOR.
STANLEY M. LOVELESS
BY
Woodhams, Blanchard and Flynn
ATTORNEYS INVENTOR.
STANLEY M. LOVELESS
BY
Woodhams, Blanchard & Flynn
ATTORNEYS Jan. 13, 1970           S. M. LOVELESS           3,489,155

PNEUMATIC PROGRAMMER

Filed March 8, 1967                                           3 Sheets-Sheet 3

INVENTOR.
STANLEY M. LOVELESS

BY
*Woodhams, Blanchard & Flynn*
ATTORNEYS

United States Patent Office 3,489,155
Patented Jan. 13, 1970

1

3,489,155
PNEUMATIC PROGRAMMER
Stanley M. Loveless, Kalamazoo, Mich., assignor to General Gas Light Company, Kalamazoo, Mich., a corporation of Michigan
Filed Mar. 8, 1967, Ser. No. 621,542
Int. Cl. G05b 11/46, 11/58, 19/44
U.S. Cl. 137—624.2                                21 Claims

ABSTRACT OF THE DISCLOSURE

A pneumatic programming device having a reciprocable input member, ratchet member, and selector member. The input member is reciprocated by a fluid pressure input signal intermittently imposed thereon and steps the ratchet unidirectionally in a first direction. After a predetermined number of input signals, the ratchet contacts a selector member which in turn actuates a work valve whereby an output signal is transmitted through the device. Opening of the work valve automatically resets the device for a new cycle of operation. The selector member permits the ratio of input signals received per output signal transmitted to be selectively varied.

---

This invention relates to a pneumatic programming device and, in particular, relates to a pneumatic counting device wherein a plurality of input signals are imposed on the device to effect the transmission thereby of a single output signal.

While the subject matter of the present invention is applicable to a wide range of systems and situations, it developed out of a need for a device capable of counting or receiving any number of signals, ranging from a very small number to a very large number, with the device transmitting a single output signal upon the application of a predetermined number of input signals thereto.

In particular, the device of the present invention is particularly adaptable for use in pneumatic control programming systems used on automatic machine tools. For example, the device of the present invention could be used on an automatically controlled drill press wherein it is desired to perform a plurality of identical drilling operations on a single machine blank. If it is desired to sequentially perform six drilling operations on the blank, the device will have imposed thereon six input signals, one for each drilling operation. Upon application of the sixth signal, the device will also transmit an additional output signal, which signal can be used for any desired purpose such as activating a conveyor device for moving the blank to its next work station. The pneumatic counting device disclosed herein is, however, well suited for other uses and the above example is solely for descriptive purposes and is not limiting.

Most prior art counting systems, particularly counting systems for controlling valve operation, have utilized a reciprocating fluid pressure operated device having a pawl member in driving engagement with a driven ratchet wheel, the ratchet wheel being moved sequentially in a series of rotary step-like movements as the fluid pressure operated device is reciprocated. A number of signals or impulses is received on the fluid pressure operated device, causing the ratchet wheel to be moved forward in one direction a number of steps until the output valve is opened. However, these devices generally require that an intermediate linkage be provided between the ratchet wheel and the output valve, or else that a port or passage be provided in the ratchet wheel, which port functions as a valve means. These systems result in increased mechanical complexity or create serious sealing problems.

2

Another problem encountered with prior counting devices is the mechanical complexity involved. Most prior devices have utilized fairly complicated mechanical systems requiring a fairly elaborate control system therefor. These devices are not only expensive to manufacture but also require a great amount of maintenance, thus resulting in an inefficient and undependable operating device. Also, most of the prior devices are not capable of being readily adjusted to obtain a multiplicity of different reduction ratios, that is, different values of the number of input signals imposed on the fluid pressure operated device to produce one output signal thereby.

Accordingly, the major objects of the present invention include:

(1) To provide a pneumatic programming device, particularly for counting, wherein a predetermined number of input signals or pulses is imposed on the device for producing one cycle of operation of an output member.

(2) To provide a pneumatic programming device, as aforesaid, wherein a predetermined number of input signals is imposed on the device for transmitting therethrough a single output signal.

(3) To provide a machine, as aforesaid, which is capable of being readily adjusted to obtain a multiplicity of different reduction ratios between the input and output members.

(4) To provide a device, as aforesaid, in which the input member is reciprocated in response to a plurality of input signals, the input member moving a driven rack member continuously forward in one linear direction until the same contacts and actuates the output member, the rack and input member then being returned to their original positions.

(5) To provide a device, as aforesaid, in which the rack and input members are automatically returned to their original positions upon actuation of the output member so as to reset the device for the initiation of a new cycle of operation.

(6) To provide a device, as aforesaid, in which an input signal is imposed upon an input member, which member is moved forward a predetermined distance in response to each signal imposed thereon, the input member driving a ratchet member linearly forward therewith in response to each input signal, the ratchet being engageable with a selector mechanism after a predetermined number of input signals whereby said selector member is movable to actuate said output member, said output member actuating and automatically controlling the return of said selector mechanism, said ratchet and said input member to their original positions for resetting the device.

(7) To provide a device, as aforesaid, which is readily adaptable for use in combination with other like devices for performing either addition or multiplication operations.

(8) To provide a device, as aforesaid, which is simple in operation, economical to manufacture, and reliable and inexpensive to maintain.

Other objects and purposes of this invention will be apparent to persons acquainted with devices of this type upon reading the following specification and inspecting the accompanying drawings.

In the drawings:

FIGURE 1 is a cross-sectional elevational view of the pneumatic programming device taken along the line I—I of FIGURE 2.

FIGURE 2 is an end view of the device showing the selector knob.

FIGURE 3 is a schematic diagram illustrating the control circuit for the device.

Figure 4:
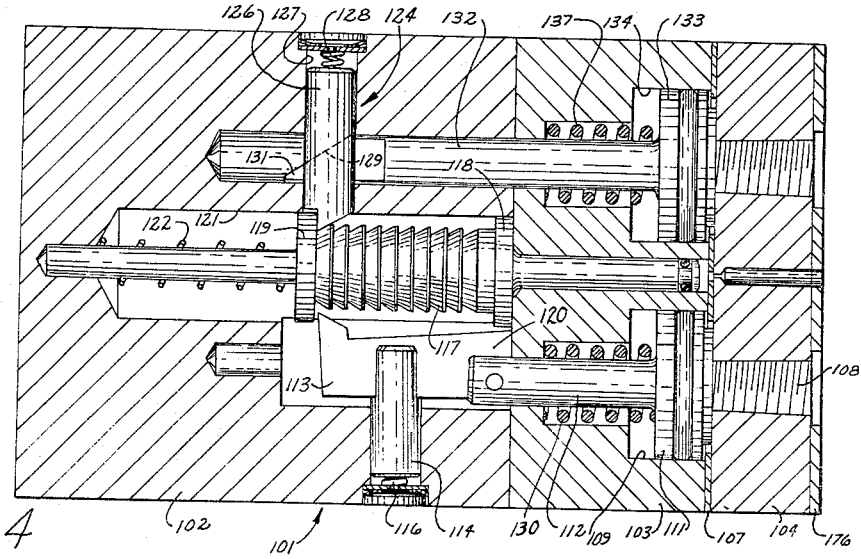
FIGURE 4 is a cross-sectional plan view taken along the lines IV—IV of FIGURE 6, showing a modification of the invention.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the direction of movement of the rack or counting member within the device when subjected to input signals and the word "rearwardly" will refer to the opposite direction. The words "inwardly" and "outwardly" will refer to directions toward and away from, respectively, the geometric center of the device and designated parts thereof. Said terminology will include the words above specifically mentioned, derivatives thereof, and words of similar import.

GENERAL DESCRIPTION

The pneumatic programming device according to the present invention comprises a housing containing a reciprocable input member, a reciprocable ratchet member, and a reciprocable selector member. The input member is subjected to a fluid pressure input signal or pulse, which signal causes the input member to be reciprocated. The input member is drivingly engaged with the ratchet whereby the ratchet is stepped unidirectionally in a first direction in response to the input signals. The ratchet has mounted thereon an abutment member which, after a predetermined number of steps, comes into contact with the selector element and moves the same unidirectionally in said first direction. Movement of the selector element causes it to come into contact with an output valve member whereby the output valve is moved to an open position allowing the input signal to be transmitted therethrough as an output signal, which is imposed upon an external load. The opening of the output member or valve causes the input member, ratchet, and selector member to be released and returned to their original position. Return of the ratchet to its original position opens an exhaust valve whereby the complete system is connected with the low pressure side of the pressure system, as being vented to the atmosphere, thus placing the device in condition for the initiation of a new cycle of operation. The selector member is rotatably adjustable whereby the reduction ratio between the number of input signals required to produce a single output signal is readily adjustable.

DETAILED DESCRIPTION OF FIGURES 1 TO 3

Referring to FIGURES 1 through 3, there is provided a housing 11 composed of any convenient number of portions. As shown, the housing comprises a center body portion 12 having end body portions 13 and 14, located on each end thereof. The end body portions are abutted by end plates 17 and 18, suitable gaskets 16 located therebetween. Any convenient means, such as bolts, can be utilized for interconnecting the various portions so as to integrally interconnect the housing 11.

Located within the end plate 18 is an inlet port 19, which port can be suitably connected with any fluid pressure source. The inlet port 19 passes through the end plate 18 and communicates with a cylindrical opening contained within the end portion 14, the opening 21 having slidably mounted therein an input member or piston 22 with a piston rod 23 integrally connected thereto. A compression spring 24 surrounds the piston rod and abuts opposed faces of the piston and housing for urging the piston to its retracted position (rightwardly as shown in FIGURE 1). The piston rod 23 is slideably supported in the housing and has an end portion extending into a central opening 26 contained within the center body portion, a drive pawl 27 being pivotally connected to the end of the piston rod by means of a pivot pin 28. A U-shaped spring 29 has its opposite legs coacting with the fixed housing and the rear surface of the drive pawl for urging same in a clockwise direction about the pivot pin 28.

The drive pawl 27 has a nose or tooth 31 thereon which is biased by the spring 29 into engagement with a reciprocable rack member 32. The rack member 32 is of a generally rectangular cross section and is slideably received within an opening 33 contained in the center body portion 12. The rack 32 is formed with a plurality of rack teeth 36 along one edge thereof, which teeth cooperate with the tooth 31 on the drive pawl 27. Rack member 32 also contains an interior opening 37 therein, which opening houses a spring 38 having its opposite ends abutting confronting faces of the rack member and housing whereby the spring normally urges the rack member to its initial position adjacent the wall of the end portion 14 (rightwardly as shown in FIGURE 1). The rack member 32 further has mounted thereon a pin 39 extending from one side thereof, the purpose of which will be further explained hereinafter.

The rack member 32 is stepped in a forward direction (leftwardly in FIGURE 1) by means of the driving pawl 27. To prevent the rack 32 from being returned to its initial position by means of the spring 38, a latch mechanism, indicated generally at 41, is provided. The latch mechanism 41 comprises a piston 42 which is slideably mounted within a cylindrical opening 43 contained within the housing 11. A holding pawl 46 is fixedly connected to and extends from the piston 42, the holding pawl being provided with a tooth 47 which coacts with and engages the teeth 36 on the rack member 32, the holding pawl being normally urged by means of a spring 48 into engagement with the rack teeth 36. The spring 48 is compressed between the holding pawl 46 and a fixed plate 49 so as to normally maintain the pawl is an engaged position with the rack. A fixed guide pin 51 is slideably received within a slot 50 provided within the end of the holding pawl for guiding the same. The piston 42 is energized by a pressurized fluid for moving the holding pawl out of engagement with the rack (downwardly in FIGURE 1) so as to permit the rack to be released for return to its initial position by means of the spring 38. However, due to the slope of the teeth 36 and 47, the rack 32 can be moved forwardly (leftwardly in FIGURE 1) whereby the pawl will be cammed downwardly to compress the spring 48 to permit one of the teeth 36 to pass over the tooth 47, the tooth 47 being returned by means of the spring 48 to its initial position for locking and holding the rack after the same has moved forward a distance equivalent to the pitch of one tooth.

Located adjacent the rack member 32 on the side opposite the input member 22 is a selector control mechanism indicated generally at 52. The selector control mechanism contains a support rod 53 which is reciprocably and rotatably supported within cylindrical openings 54 and 55 in the housing 11. A selector member 58 is mounted on the support rod 53 and is affixed thereto by means of a transverse pin 59, a compression spring 61 being mounted between the selector member 58 and a confronting wall of the housing whereby the spring normally urges the selector mechanism to an initial position as shown in FIGURE 1. The initial position of the selector member is defined by means of a snap ring 62 on the support rod 53 which abuts a face of the end portion 14, thus limiting the rightward movement of the selector control mechanism. As illustrated, the selector member 58 is a generally tubular member having a plurality of axial longitudinal slots formed in one end thereof. The slots 63 are equally spaced around the periphery of the tube but are all formed of different lengths, the length of the slots 63 being progressively increased as the slots are angularly positioned around the periphery of the tube. The longitudinal slots 63 are preferably of a length which is a multiple of the step distance moved by the rack member 32 when moved in response to an input signal imposed on the input piston 22, the input step distance being substantially equal to the pitch distance between two successive teeth 36 on the rack member 32. Therefore, if the selector 58 is provided, for example, with six longitudinal slots therein, the six slots will have a length which will progressively vary from a one-step distance (that is, the distance separating two successive teeth 36) up to a six-step distance.

A selector control knob 66 is fixedly mounted on the end of the support rod 53 which extends outwardly from the housing 11. The selector control knob is provided with a plurality of recesses 65 on the inner surface thereof, which recesses cooperate with a spring-biased ball detent 67 located in the end plate 18. The ball detent 67 engages one of the recesses 65 for holding the selector control knob and the associated selector control mechanism in a fixed angular position. The face of the selector control knob 66 is provided with indicia thereon as shown in FIGURE 2. The numerals on the face of the selector control knob correspond with the recesses 65 on the inner face thereof and accordingly correspond with the longitudinal slots 63 located in the selector 58. As illustrated, the face of the selector control knob is numbered from 1 to 6, which numbers correspond to the six slots 63 located within the selector 58. The number 1 position corresponds to the slot 63 having a longitudinal length equal to a one-step distance; similarly, the number 2 position corresponds to the slot 63 having a longitudinal length equal to two-step distances. The other position numbers similarly indicate the same length of the longitudinal slot expressed in terms of the number of step distances. As illustrated, with the knob in the number 6 position, the longest longitudinal slot having a longitudinal distance equal to a six-step distance is positioned so as to be engageable with the extending pin 39 located on the rack member 32. The slots 63 have a width which is slightly greater than the diameter of the pin 39 so as to permit the latter to freely slide therein as the rack 32 is moved linearly forwardly (to the left as shown in FIGURE 1).

Mounted within the end portion 13 axially aligned with the selector mechanism 58 is a normally closed first control valve 68, which control valve functions as a work valve or output member. The control valve 68 is mounted within a cylindrical opening in the housing 13 and has an operating contact 69 extending from one end thereof. Said valve is of any convenient type and may be of the type shown generally in the U.S. Patent No. 2,912,009 to Ralph D. Cooksley. However, for convenient reference the following description of such a valve is set forth.

A central rod 211, terminating in mechanical contact 69 extends loosely and preferably coaxially through the central passageway 217 and coaxially carries the valves 233 and 234. Said rod and valves are contained within a cylindrical casing 212 which is internally shaped to provide valve seats 213 and 214. The valves are spaced so that only one valve at a time can contact its seat.

A compression spring 71 is disposed at the leftward end of the central rod 211 for urging the central rod 211 and, hence, the valves rightwardly. Thus, the spring 71, in the absence of other forces on the rod 211, urges the valve 234 rightwardly against the seat 214 to isolate the chamber 216 from the central passageway 217 and to hold said valve normally closed. When the central rod 211 is moved leftwardly against the spring 71, as by mechanical force applied to the contact 69, it separates valve 234 from the valve seat 214 which connects the inlet port 77 through compartment 216 and past the valve seat 214 with the central passageway 217 and thence with the outlet, or load, port 78. Return of the valves to their rightward position as shown connects the load passageway 78 to exhaust at 218.

A second control valve 72, axially aligned with the rack member 32, is of the same construction and has a contact 73 extending from one end thereof, the valve being mounted within a cylindrical opening contained in the end portion 14. The valve is normally urged into the closed position as illustrated in FIGURE 1 by means of a compression spring 74 which corresponds to the spring 71 in valve 68. Return movement of the rack 32 by means of the spring 38 causes the end face of the rack to abut the plunger 73 to move the valve 72 from the closed to the open position in opposition to the spring 74.

FIGURE 3 is a schematic diagram illustrating the manifold passages which are formed within the housing 11 for interconnecting and controlling the pistons and control valves therein. As illustrated, a main pressure line (shown also in broken line 77 in FIGURE 1) is connected from an external fluid pressure source to the inlet port 19. The inlet line 77 branches off the inlet port 19 and leads to the first control valve 68 whereby the input pressure signal is transmitted thereto. The inlet line 77 is normally closed by reason of the first control valve 68 being maintained in a normally closed position. An outlet line 78 leads from the first control valve 68, which outlet line 78 further branches into a load line 79 connected to an external load and a control line 81. Control line 81 further divides into a latch release line 82 and a relief line 83. The latch release line 82 leads to and conrtols the movement of the latch release piston 42. The relief line 83 leads to the second control valve 72, which valve is normally maintained in a closed position. An exhaust line 84 from the valve 72 exhausts to the atmosphere. Forward reciprocable movement of the selector control mechanism (leftwardly as shown in FIGURE 1) causes the end of the support rod 53 to abut the plunger 69, thus causing the valve 68 to be moved to its open position.

The programmer of the present invention is preferably pneumatically operated since most manufacturing operations have a ready supply of compressed air available. However, the programmer could utilize any type of compressible or noncompressible pressurized fluid.

OPERATION

In initiating a cycle of operation of the device, the input piston 22, the rack 32, and the selector mechanism 52 will be in their initial positions (rightwardly as shown in FIGURE 1), the input piston 22 will be urged into abutting engagement with the housing by means of the spring 24. Rack 32 will likewise be urged into abutting engagement with the housing by means of the spring 38, the end face of the rack contacting the plunger 73 to hold the second control valve in an open position. The selector control mechanism 52 will also be urged by the spring 61 rightwardly to the position shown in FIGURE 1 wherein the snap ring 62 abuts the housing 11. In this initial position, the first control valve 68 will be maintained in its closed position by means of the spring 71, while the latch mechanism 41 will be maintained in an uppermost or engaging position substantially as shown in FIGURE 1 by means of the spring 48. Before initiating operation, the operator will first rotate the selector knob 66 to the desired position to select the desired reduction ratio. Assuming the operator has rotated the knob to position 6 as shown in FIGURE 2, the longest slot 63 will be positioned to engage the pin 39 during the operation of the device, a reduction ratio of six to one being utilized.

To initiate operation, a first fluid pressure pulse or signal will be transmitted through the main pressure line 76 and the inlet port 19 into the power cylinder 21–22. The same pressure pulse will be transmitted through the inlet line 77 to the first control valve 68, which pulse will be stopped at this point due to the closed position of the valve. Imposition of the first pressure pulse to the piston 22 will cause the piston to move forwardly whereby the drive pawl 27 will engage the teeth 36 of the driven rack 32 and cause the same to be linearly moved. The rack 32 will be moved forward a distance approximately equal to one tooth distance, the rack 32 being prevented from returning to its original position by means of the spring-biased holding pawl 46. During this first step of movement, the rack 32 will move away from the plunger 73 and thus permit the spring 74 to close the second control valve 72. Likewise, during the first step of movement the pin 39 will slide a small distance into the slot 63, the selector mechanism 52 not being moved.

Upon termination of the first pressure pulse, piston 22 is returned to its original position (rightwardly in FIGURE 1) by the spring 24, which returned movement causes the nose 31 of the pawl 27 to disengage from the teeth 36 of the rack 32. A pawl release pin 27' can be provided so as to engage the inside of the nose 31 and cause the pawl to release the rack when the pawl is moved rearwardly toward its original position, such a pawl release pin being conventional and well known, as shown for example in U.S. Patent No. 660,766.

In a similar manner, a second, third, fourth and fifth pulse will be applied to the piston 22, each of said pulses causing the piston to move linearly forward a distance of approximately one step whereby the rack is likewise moved forward one-step or one-tooth distance, the rack being held in the new position by means of the holding pawl 46. At the end of the fifth pulse, the pin 39 will have travelled down the length of the slot 63 so as to be approximately in contact with the end thereof. Upon application of the sixth pressure pulse to the piston 22, the rack 32 will be stepped linearly forward one more step. During the sixth-step movement, the pin 39 will engage the end of the selected one of the slots 63 and thus cause the selector mechanism 52 to be linearly moved within the housing against the bias of the spring 61. Movement of the selector mechanism causes the end face of the support rod 53 to contact the plunger 69 whereby the first control valve 68 is moved from the closed to the open position.

The opening of the first control valve 68 will permit the sixth pressure pulse to be transmitted through the inlet line 77 into the outlet line 78 and thence through the load line 79 for imposition of the pressure pulse onto an external load. Likewise, the sixth pressure pulse will also be transmitted through the control line 81 into the latch release line 82 and the relief line 83, the latter line being closed by means of the second control valve 72. The pressure fluid passing through the latch line 82 will enter into the latch cylinder 43 and move the piston 42 so as to withdraw the holding pawl 46 from the rack 32 (downwardly as shown in FIGURE 1). Said pressure fluid also fills line 83 and the rightward side of valve 72 but since said valve 72 is normally closed, said fluid cannot escape. Upon the termination of the said sixth pulse, and with the holding pawl 46 retracted, the springs 38 and 61 will at once move the rack 32 and the selector 52 rightwardly. Rightward movement of the selector permits the valve 68 to close and trap the fluid within lines 81 and 83 to hold the pawl 46 retracted. As the selector 32 moves to its full rightward position, it contacts the plunger 73 of the valve 72 to open same and vent the fluid from the lines 78, 79, 81, 82 and 83. This permits the pawl 46 to respond to the spring 48 and move again upward into rack-engaging position. All parts are now returned to their initial condition and ready for a new cycle.

As described above, the programming device has been subjected to six fluid pressure pulses with only the sixth pulse being transmitted therethrough for imposition, through delay means (not here shown) if desired, on an external load. Furthermore, at the completion of the sixth pulse, the device has been returned to its initial position of operation and is thus in condition for initiation of a new cycle of operation. Furthermore, if desired, the operator can readily select the count to be performed by merely rotating the selector control knob to any position and the device will transmit only a single pulse to the load for each predetermined number of input pulses applied thereto.

MODIFICATION

FIGURES 4 through 7 illustrate a modified arrangement for the basic invention described above. As illustrated in FIGURE 4, the housing 101 is composed of a main body portion 102, a valve body portion 103, and an end plate 104, the latter two sections being separated by means of a gasket 107. The housing portions can be rigidly interconnected by any suitable means such as bolts.

An inlet port 108 is located in and passes through the end plate 104, which port communicates with a cylindrical opening 109 located within the housing. Slideably mounted within the opening 109 is a piston 111 having an integral piston rod 112, the piston rod being slideably received within the housing and having a driving pawl 113 pivotally mounted on the end thereof. The driving pawl 113 is biased in a clockwise direction about its pivot by means of a pusher element 114, which element is in turn biased by means of a spring 116.

The tooth portion of the driving pawl 113 is biased into engagement with a cylindrical rack 117 formed with a plurality of teeth spaced along the length thereof. Rack 117 has flanges 118–119 at the ends thereof, which ends are slideably received within a cylindrical opening 121 formed within the housing 101. A spring 122 acts between the housing and the flange 119 for biasing the rack into an initial position wherein the flange 118 abuts the housing.

The driving pawl 113 is normally maintained out of engagement with the rack 117 when the piston 111 is in its rearward or retracted position (see FIGURE 4) due to the fact that the rear edge of the pawl is maintained in engagement with a suitable wall or stop on the housing. As the piston 111 moves forwardly (leftwardly in FIGURE 4) due to the imposition of a pressurized fluid thereto, pawl 113, due to the action of the spring-biased pusher element 114, tends to rotate about the corner portion 120 (clockwise in FIGURE 4) so as to bring the nose portion of the pawl into driving engagement with the teeth formed on the rack 117. When the spring 130 returns the piston 111 to its original position illustrated in FIGURE 4, the pawl corner 120 initially contacts the housing wall whereupon the pawl pivots about the corner (counterclockwise in FIGURE 4) in opposition to the spring-biased pusher member 114 so as to disengage the pawl 113 from the rack 117.

A latch mechanism 124 (FIGURE 4) is located adjacent the rack 117 on the side thereof opposite the driving pawl 113. The latch mechanism comprises a latch member or holding pawl 126 which is slideably received within an opening 127 in the housing, the holding pawl being biased by means of a compression spring 128 into engagement with the teeth on the rack 117. The holding pawl has a tapered cam surface 129, which surface coacts with a mating tapered cam surface 131 located on a reciprocable latch release plunger 132. The latch release plunger 132 is mounted for movement transverse to the pawl movement and is integrally connected with a piston 3 slideably mounted within a cylindrical opening 134 in the housing 103. A spring 137 biases the piston and the latch release plunger rightwardly as shown in FIGURE 4 whereby the spring maintains the holding pawl in an engaged position with the rack. Energization of piston 133 causes the latch plunger 132 to move forwardly (leftwardly as shown in FIGURE 4) whereby the holding pawl 126 is cammed outwardly from the rack, permitting the rack to be released.

A selector control mechanism 139 (FIGURE 5) is located directly above the rack 117 for actuation thereby. The selector control mechanism comprises a selector element 141 having cylindrical bearing portions 142–143 which are rotatably and reciprocably received within the housing 101. A spring 144 bears against the end portion 142 so as to bias the selector mechanism into an initial position whereby the shoulder 147 abuts the housing 101. A plurality of pins 148 are located on the periphery of the selector 141 and extend radially therefrom. The pins 148 are angularly and axially spaced along the periphery of the selector member substantially as shown.

A selector knob 149 is fixedly mounted on the end of the bearing portion 143, the knob having indicia of the face thereof for indicating the selector position. The selector is rotated into any desired position by merely rotating the knob 149 until the appropriate position is reached. At any selected position, one of the pins 48 will be so located as to lie in the path of movement of the end flange 118 so as to be contacted and moved thereby. When the desired position has been selected, the selector is rotatably fixed in that position by means of a screw 152 mounted within the housing, which bolt has a suitable spring loaded ball 153 on the end thereof for engagement with one of a plurality of elongated slots 154 located in the end of the selector member 141. The locking screw 152 inhibits rotation of the selector but permits the selector mechanism to have a limited linear reciprocable movement by means of the elongated slots 154.

Figure 7:
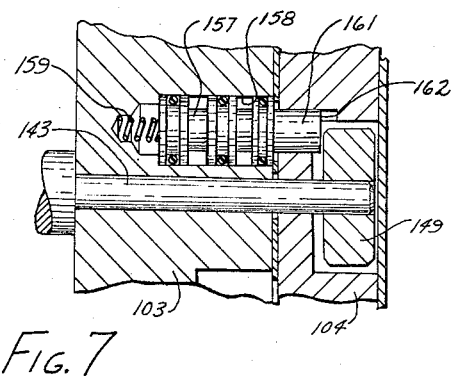
FIGURE 7 is a partial cross-sectional view taken along the lines VI—VI of FIGURE 6.

As shown in FIGURE 7, a control or work valve 157 is mounted within a cylindrical opening 158 in the housing portion 103 for contact with and actuation by the selector control mechanism. The work valve 157 is normally urged and maintained in its closed position by means of a spring 159 coacting between the valve body and the housing. The valve is provided with an extension or plunger 161 extending from one end thereof, the end face 162 thereof being so positioned that the latter is linearly moved forwardly (leftwardly as shown in FIGURE 7) by engagement of the flange 118 with the pin 148, which engagement causes the selector mechanism 141 to be linearly moved in a forward direction whereby the knob 149 comes into contact with and depresses the plunger 161 to move the work valve 157 into an open position in opposition to the urging of the spring 159.

Figure 5:
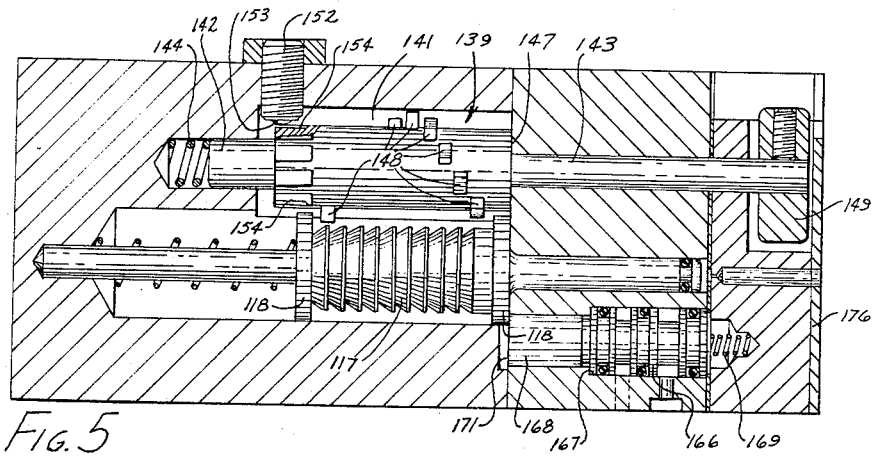
FIGURE 5 is a cross-sectional elevational view taken along the lines V—V of FIGURE 6.

Another control valve is located adjacent the work valve, the second control valve permitting the device to be exhausted to the atmosphere and recycled. The second control or recycle valve 166 (FIGURE 5) is slideably mounted within a cylindrical opening 167 contained in the housing portion 103. Valve 166 is normally maintained in a closed position by means of a spring 169 which acts between the valve body and the housing 101. The recycle valve has a plunger or extension 169 on one end thereof, which plunger coacts with the flange 118 on the rack member for actuation thereof. Linear movement of the rack 117 to its initial position whereby the flange 118 abuts the housing causes the flange 118 to also contact the plunger 168 so as to depress the same inwardly (rightwardly as shown in FIGURE 5) against the bias of the spring 168 whereby the valve is moved from the closed to the open position, thereby venting the system to the atmosphere.

Figure 6:
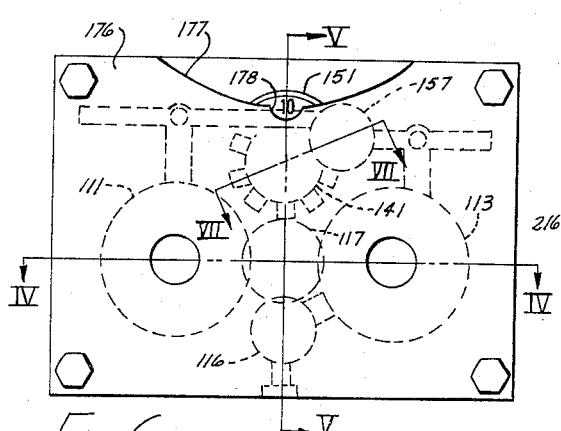
FIGURE 6 is an end view of the modified invention illustrated in FIGURE 4, showing the selector knob with the control passages shown by dotted lines.

As shown in FIGURE 6, the end of the housing has a face plate 176 attached thereto, which face plate has a cut-away portion 177 in the upper edge thereof to permit the operator to have access to the selector knob 149 for rotation thereof, the cut-away portion being notched at 178 to permit the selected position to be visually indicated by being located within the notch 178. In this manner, the operator can readily rotate the knob and select any desired position by positioning the desired numeral or indicia within the notched opening.

This modification of the invention operates in exactly the same manner as described above. Furthermore, the pistons and valves are interconnected by means of manifold passages in exactly the same manner as indicated schematically in FIGURE 3. The rack flange 118 and the selector pin 148 cooperate in exactly the same manner as the pin and slot modification previously described so as to produce the desired reduction ratio. However, this modification offers a constructional advantage in that the latch release cylinder, the input cylinder, the work valve and the recycle valve are all located within the housing portion 103, thus greatly simplifying the construction of the housing and of the manifolds interconnecting the various cylinders. Furthermore, the problem of sealing the device is greatly simplified.

Considering the latch mechanism 124 shown in FIGURE 4, it would be obvious that the mechanism illustrated could be replaced by means of an intermediate linkage connecting the piston 132 with the holding pawl 126. For example, the holding pawl could be formed as a lever having a central pivot whereby the lever is pivotably mounted to the housing, a holding pawl or tooth portion being formed on one end of the lever for engagement with the rack, the other end of the lever being engageable with the latch release piston for movement thereby, whereby actuation of the piston would cause the lever to pivot so as to swing the pawl out of engagement with the rack, the lever and pawl being held normally in engagement with the rack by means of a spring.

Figure 8:
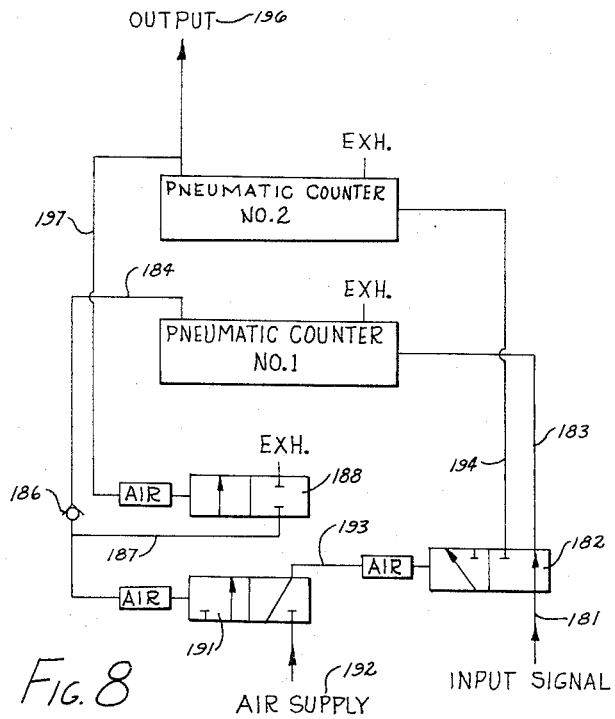
FIGURE 8 illustrates a schematic diagram showing the use of two counters according to the present invention for performing addition.

FIGURE 8 schematically illustrates a manner in which the pneumatic programming device of the present invention can be utilized for performing adding operations. The circuit illustrated shows the use of first and second pneumatic counters interconnected whereby the addition of the selector knob setting of the second counter is added to the setting of the first counter. Assuming a count of 11 is desired, pneumatic counter number 1 will be set at 6 and pneumatic counter number 2 will have its selector knob set at 5.

In operation, a pneumatic input signal or pulse is transmitted through the input line 181 to the normally open air operated directional air control valve 182. The signal is transmitted through the valve 182 and the passage 183 to the first pneumatic counter number 1. At signal number 6, air will pass through counter number 1, and then on through the outlet line 184 and the check valve 186. Pressurized air will then be transmitted through the passage 187 to the input port of the valve 188 and also through the passage 189 to the pilot port of the air operated pilot valve 191. Valve 191 is thus opened, allowing air from an air supply 192 to pass therethrough by means of the passage 193. The air passing through the pilot valve 191 will then be applied to the pilot port of the directional control valve 182, causing the same to shift from a first open position to a second position wherein the input passage 181 is in communication with a passage 194 coupled to the second pneumatic counter. Valve 182 will then direct the next five input signals to counter number 2. At signal number 5 to the second counter (11 total), air will pass through counter number 2 to the output illustrated schematically at 196, and air will also pass through the passage 197 to the pilot port of the valve 188, causing the same to be opened whereby lines 187 and 189 are exhausted to the atmosphere, causing valve 191 to close. This in turn shuts off the air supply 192 from the system and allows the valve 182 to return to its original position whereby the input line 181 is again connected with the first pneumatic counter and the system is in condition for initiation of a new cycle of operation.

Figure 10:
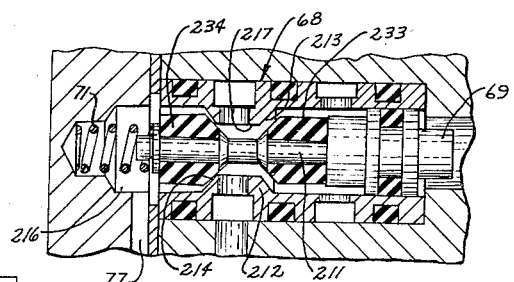
FIGURE 10 is a detail of a typical valve unit used herein.

The above example has been given for purposes of illustration only and is not limiting. It is obvious that any number of pneumatic counters could be suitably coupled as illustrated in FIGURE 10 so as to permit the system to have the capabilities of adding any number desired. Such systems are deemed to be well within the skill of one having ordinary skill in the art in light of the disclosure relating to the present invention and of the manner of making and using the same. The counters shown in FIGURE 8, though illustrated only in block diagram form, incorporate therein essentially the same structure and operate in substantially the same manner as previously described above.

Figure 9:
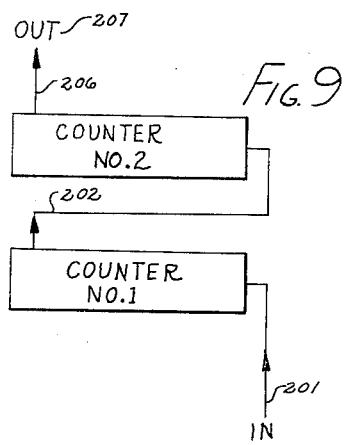
FIGURE 9 is a schematic diagram showing the use of two counters according to the present invention for performing multiplication.

FIGURE 9 schematically illustrates the manner in which a plurality of counters according to the present invention can be utilized so as to perform a multiplication-type of operation. The counters shown, though illustrated only in block form, are constructed and operate in substantially the same manner as described above. As illustrated, the input line 201 is connected to the input port of the first counter 1 for subjecting the same to a series of pressure pulses. The output line 202 from counter number 1 is connected to the inlet port of counter number 2. The outlet passage 206 of counter number 2 is connected to an external load 207. Assuming that a multiplication or a reduction of fifteen is desired, the selector knob of counter number 1 will be set at five and the selector knob of counter number 2 will be set at three. Pressure pulses will then pass through inlet passage 202 into the counter number 1, the counter acting in a conventional manner as described above. At input signal number 5, air will pass through counter number 1 into the outlet passage 202, the output signal of counter number 1 effectively acting as an input signal for counter number 2. After counter number 1 has undergone three complete cycles of operation, that is, having been subjected to 15 input pulses, counter number 1 will have transmitted one output pulse for every five input pulses applied thereto. The 15 input pulses to counter number 1 will retransmit three output pulses therefrom, the three output pulses effectively acting as input pulses to counter number 2. Application of the three input pulses to counter number 2 will complete one cycle of operation of counter number 2 and will permit one output pulse to be transmitted therethrough to the load. In this manner, the application of 15 input pulses to counter number 1 has resulted in the transmission of one output pulse from counter number 2, thus resulting in a reduction or multiplication ratio of 15 to 1.

It will be recognized that by this invention the counting mechanism, whether used singularly or in combination, can be used to count any number whether large or small, thus resulting in a mechanism having wide adaptability to a great number of different and diverse uses. Furthermore, variations in the counting cycle require a minimum amount of operator effort since the device and the counting cycle can be adjusted simply by rotating an external control knob and does not require any disassembly or modification of the programming mechanism.

Further, the device described is of relatively low cost to build and to maintain. The mechanical structure and its interconnections with the pressurized or pneumatic control system is contained within a compact housing and is thus very simple to use and to maintain, dependability of operation thus being insured.

Although particular preferred embodiments have been described for illustrative purposes, it will be recognized that variations or modifications of such disclosure which lie within the scope of the appended claims are fully contemplated.

The embodiments of the invention in which an exclusive property or privilege is claimed are defined as follows:

1. A programming device, in particular a device for counting a predetermined number of signals per cycle of operation thereof with said device emitting a single output signal per cycle of operation, said device comprising:
   an input means, said means being movable in response to a plurality of fluid pressure pulses or signals applied thereto;
   movable counting means movable in response to the signals applied to said input means, said movable counting means including a counting member and means guiding same for linear movement;
   coupling means interconnecting said input means to said counting means for effecting unidirectional movement of said counting member in a first direction responsive to application of said predetermined number of signals to said input means;
   latch means for normally preventing movement of said counting member in a direction opposite said first direction;
   valve means for emitting a single output signal per cycle of operation;
   control means operably connecting said counting means and said valve means for transmitting at least a portion of the motion of the counting member to said valve means so as to actuate same, said control means including adjustment means for transmitting said motion from said counting member to said valve means at one of several predetermined positions of said counting means;
   means urging said counting member toward its initial position; and
   means responsive to actuation of said valve means for actuating said latch means so as to unlatch said counting member.

2. The device of claim 1 wherein said input means comprises a piston guided for reciprocal movement, said piston being moved in response to the application of signals thereto.

3. The device of claim 1 wherein said counting member comprises a rack having teeth thereon, said teeth being engaged by said input means for movement thereby.

4. The device of claim 1 wherein said control means is mounted for reciprocable and rotatable movement, said control means being rotatable to select a predetermined number of signals per cycle of operation, and being reciprocal to permit said control means to be returned to its initial position for actuation by said movable counting means.

5. The device of claim 1 wherein said counting member comprises a reciprocably mounted ratchet having teeth thereon, said means urging said counting member toward its initial position including spring means biasing said ratchet toward said initial position, said latch means being releaseably engageable with said ratchet for holding the same after said ratchet has been moved by said input means in response to the application of signals thereto.

6. The device of claim 5 wherein said latch means includes a spring-biased latch member and said means responsive to actuation of said valve means includes a release piston connected to said latch member, energization of said release piston causing said latch member to disengage from said ratchet whereby said ratchet is returned to its initial position by means of said return spring.

7. The device of claim 4 wherein said control means includes a cylindrical selector member having a plurality of axial slots angularly spaced thereon, said slots being of different length;
   said counting member having a pin thereon extending into one of said slots.

8. The device of claim 4 wherein said control means includes a cylindrical selector member having a plurality of pins radially extending therefrom, said pins being spaced angularly and axially along said member;
   said counting member having an abutment positioned so as to engage with one of said pins.

9. The device of claim 4 wherein said control means includes a cylindrical selector member having a control knob connected thereto, said control knob permitting the number of signals per cycle of operation to be manually adjusted and selected.

10. The device of claim 4 wherein said input means comprises a power piston, said valve means and said power piston both being subjected to said predetermined number of signals, said valve means permitting said output signal to be transmitted therethrough following the application of said predetermined number of signals thereto.

11. The device of claim 10 wherein said means responsive to actuation of said valve means includes a pressure-operated release means for permitting said counting member to be returned into its initial position.

12. The device of claim 4 wherein said latch means includes a latch member spring biased in engagement with said counting member and said means responsive to actuation of said valve means includes a release piston connected to said latch member, said release piston being energized to release said latch from said counting member when said valve means transmits said output signal therethrough.

13. The device of claim 1 wherein said valve means includes a work valve and a recycle valve, said work valve being normally closed;
    said control means further including a rotatably and reciprocably mounted selector member, rotatable movement of said selector member determining the number of pulses for one cycle of operation of the device, said selector member being driven in a first linear direction by said counting means and engaging said work valve for opening the same whereby said output pulse is transmitted therethrough;
    said latch means having a spring-biased latch member in engagement with said counting member to hold the same and a release piston connected to said latch member for releasing the latch member from engagement with said counting member, said release piston being energized by said output signal when said work valve opens to permit said counting member to return to its initial position.

14. The device of claim 13 further including a selector return spring for returning said selector member to its initial position after the release of said counting member by said latch means.

15. The device of claim 13 wherein said recycle valve is actuated by said counting member when said counting member returns to its initial position, said counting member causing said recycle valve to open whereby said release piston is de-energized and the latch member allowed to re-engage the counting member.

16. The device of claim 14 wherein said selector member contains a plurality of axial slots angularly spaced thereabout, said slots being of different length;
    said counting member having a pin projecting therefrom engageable with one of said slots.

17. The device of claim 14 wherein said selector member includes a plurality of pins radially extending therefrom, said pins being radially and axially spaced thereabout;
    said counting member including an abutment engageable with one of said pins.

18. The device of claim 1 wherein said signals are pneumatic pressure pulses.

19. A programming device, in particular a device for counting a predetermined number of signals per cycle of operation thereof, with said device emitting a single output signal per cycle of operation, said device comprising:
    an input means, said means being movable in response to a plurality of fluid pressure pulses or signals applied thereto;
    movable counting means movable in response to the signals applied to said input means, said movable mounting means including a counting member movable stepwise unidirectionally from an initial position in response to the application of said signals to said input means;
    coupling means interconnecting said input means to said counting means for effecting said stepwise unidirectional movement of said counting member in a first direction from said initial position in response to the application of a predetermined number of signals to said input means;
    latch means for normally preventing movement of said counting member in a second direction opposite said first direction;
    output valve means for emitting a signal output signal per cycle of operation of said device;
    means coacting between said counting means and said valve means for transmitting at least a portion of the motion of the counting member to said output valve means so as to actuate same and permit emission of said single output signal and including selector means for selecting said predetermined number of signals for each cycle of operation of said device;
    means urging said counting member in said second direction toward its initial position; and
    means responsive to actuation of said output valve means for actuating said latch means so as to unlatch said counting member.

20. A programming device according to claim 19, further including passageway means for transmitting said fluid pressure signals to said input means and said output valve means, said passageway means including a first passageway for transmitting said signals to said input means and a second passageway for transmitting said signals to said output valve means, said passageway means including a third passageway adapted to communicate with said second passageway, said output valve means normally preventing communication between said second and third passageways and permitting communication between said second and third passageways when actuated by said counting member whereby one of said fluid pressure signals is transmitted from said second passageway through said output valve means into said third passageway so as to constitute said output signal.

21. A programming device according to claim 20, wherein said means responsive to actuation of said valve means includes a fluid actuated piston member operably connected to said latch means for moving same to an unlatched position, and said passageway means including a fourth passageway communicating between said piston member and said output valve means for transmitting said fluid pressure output signal therethrough whereupon imposition of said fluid pressure output signal on said piston member causes said latch means to move and unlatch said counting member.

References Cited

UNITED STATES PATENTS

| 3,145,736 | 8/1964 | Gheen | 251—230 X |
| 3,147,770 | 9/1964 | Perlis | 137—624.13 |
| 3,344,809 | 10/1967 | Smith | 251—230 X |
| 3,345,915 | 10/1967 | Dotto | 137—624.13 X |

FOREIGN PATENTS

| 1,117,999 | 3/1956 | France. |

ALAN COHAN, Primary Examiner

U.S. Cl. X.R.

251—230